United States Patent
Lin et al.

(10) Patent No.: US 6,840,402 B2
(45) Date of Patent: Jan. 11, 2005

(54) PROBE COVER DISPENSER

(75) Inventors: Kevin Lin, Hsin-Chu (TW);
Chu-Chung Yin, Hsin-Chu (TW)

(73) Assignee: Radiant Innovation Inc., Hsin-Chu (TW)

( * ) Notice: Subject to any disclaimer, the term of this patent is extended or adjusted under 35 U.S.C. 154(b) by 182 days.

(21) Appl. No.: 10/200,224

(22) Filed: Jul. 23, 2002

(65) Prior Publication Data

US 2004/0016766 A1 Jan. 29, 2004

(51) Int. Cl.[7] .............................................. B65H 43/04
(52) U.S. Cl. ........................ 221/198; 221/226; 221/236; 221/279
(58) Field of Search ................................. 221/198, 226, 221/236, 239, 244, 251, 279, 303, 59, 61, 63; 374/158

(56) References Cited

U.S. PATENT DOCUMENTS

| | | | |
|---|---|---|---|
| 4,535,913 A | * | 8/1985 | Hooie et al. ................. 221/251 |
| 4,589,575 A | * | 5/1986 | Rigberg et al. .............. 221/198 |
| 4,993,424 A | | 2/1991 | Suszynski et al. |
| 5,100,018 A | | 3/1992 | Rosati et al. |
| 5,785,206 A | * | 7/1998 | Chan .......................... 221/271 |
| 6,097,979 A | | 8/2000 | Janotte |
| 6,123,454 A | * | 9/2000 | Canfield et al. ............. 374/158 |

* cited by examiner

Primary Examiner—David H. Bollinger
(74) Attorney, Agent, or Firm—Rosenberg, Klein & Lee

(57) ABSTRACT

A probe cover dispenser comprises a main body, an elastic component, and a separation board. The main body has a receiving groove therein. A groove is disposed at the top end of the main body. The elastic component is disposed in the receiving groove. One end of the elastic component is fixed at the bottom of the receiving groove, and the other end thereof is connected with a separation sheet. A plurality of probe covers are stacked in the receiving grooves above the separation sheet. The separation board is disposed in the groove at the top end of the main body. One end of the separation board is pivotally connected with the top end of the main body so that the separation board can be screwed into the groove at the top end of the main body to separate the first probe cover from the second probe cover.

8 Claims, 5 Drawing Sheets

PROBE COVER DISPENSER

FIELD OF THE INVENTION

The present invention relates to a probe cover dispenser and, more particularly, to a device capable of automatically sending out a probe cover to cover on a probe of an ear thermometer.

BACKGROUND OF THE INVENTION

It is necessary to measure the body temperature when one is under the attack of fever. There are four portions of the body whose temperatures are measured: mouth, armpit, anus, and eardrum. Generally, mouth temperature or armpit temperature is measured for adults, while anus temperature or eardrum temperature is measured for infants. Eardrum temperature and anus temperature are close to the central temperature of the body, and are more stable than armpit temperature and mouth temperature. Moreover, it is easier to measure eardrum temperature and anus temperature.

Using an ear thermometer to measure eardrum temperature is a common way of measuring the body temperature nowadays. Because earwax easily accumulates on a probe of the ear thermometer after a long time of use, infection due to disease germs may occur between users. Therefore, it is necessary to replace a new probe cover after each time of use.

For a common ear thermometer, it is necessary to take a probe cover with hands and then slip the probe cover onto a probe thereof. Therefore, the problems of contamination of probe cover and infection due to disease germs may easily occur. In order to prevent hands from touching a probe cover, U.S. Pat. No. 4,993,424 discloses an infrared body temperature measurement device, wherein a probe cover storage room and a conveyance device are disposed in an ear thermometer (i.e., the infrared body temperature measurement device) so as to directly install probe covers into the ear thermometer and then to convey them to the head. When a probe retracts into the head, a probe cover can directly cover the probe. However, the disclosed infrared body temperature measurement device has a very complex structure, a larger volume, and an expensive price that common customers cannot afford.

U.S. Pat. No. 5,100,018 discloses a probe cover dispenser. As shown in FIG. 1, a probe cover dispenser 10 comprises a main body 12. A probe cover storage room 14 for stacking of probe covers and a probe cover baffle 16 for controlling downward conveyance of probe covers are disposed at the lower portion of the main body 10. A pressing plate 18 and a spring 20 for adjusting the pressing plate 18 are matched at the upper side of the probe cover storage room 14. A slide plate seat 22 is disposed at the lower side of the probe cover storage room 14. A probe cover retaining groove 24 capable of receiving a probe cover is disposed on the slide plate seat 22. The slide plate seat 22 is pushed toward the main body 12 to drive the probe cover baffle 16 so that the probe cover retaining groove 24 can slide down to be exactly below the probe cover storage room 14 to receive a probe cover. Next, the slide plate seat 22 is pulled out so that a probe of an ear thermometer can probed into the probe cover in the probe cover retaining groove 24. However, this probe cover dispenser has a very complex structure and an expensive price that common people cannot afford.

Accordingly, in consideration of the above problems, the present invention aims to propose a probe cover dispenser, which adopts a simple structure to automatically send out probe covers.

SUMMARY OF THE INVENTION

The primary object of the present invention is to provide a probe cover dispenser of a simple structure so that a user can cover a probe cover onto a probe of an ear thermometer without touching the probe cover with hands, thereby effectively lessening the problems of contamination of probe cover and infection due to disease germs.

Another object of the present invention is to provide a probe dispenser, which has a simple structure and a cheap price, and can be easily popularized.

According to the present invention, a probe cover dispenser comprises a main body, an elastic component, and a separation board. The main body has a receiving groove therein. A groove is disposed at the top end of the main body. The elastic component is disposed in the receiving groove. One end of the elastic component is fixed at the bottom of the receiving groove, and the other end thereof is connected with a separation sheet. A plurality of probe covers are stacked in the receiving grooves above the separation sheet. One end of the separation board is pivotally connected with the top end of the main body so that the separation board can be screwed into the groove at the top end of the main body to separate the first probe cover from the second probe cover.

The various objects and advantages of the present invention will be more readily understood from the following detailed description when read in conjunction with the appended drawing, in which:

DETAILED DESCRIPTION OF THE PREFERRED EMBODIMENTS

Figure 1:
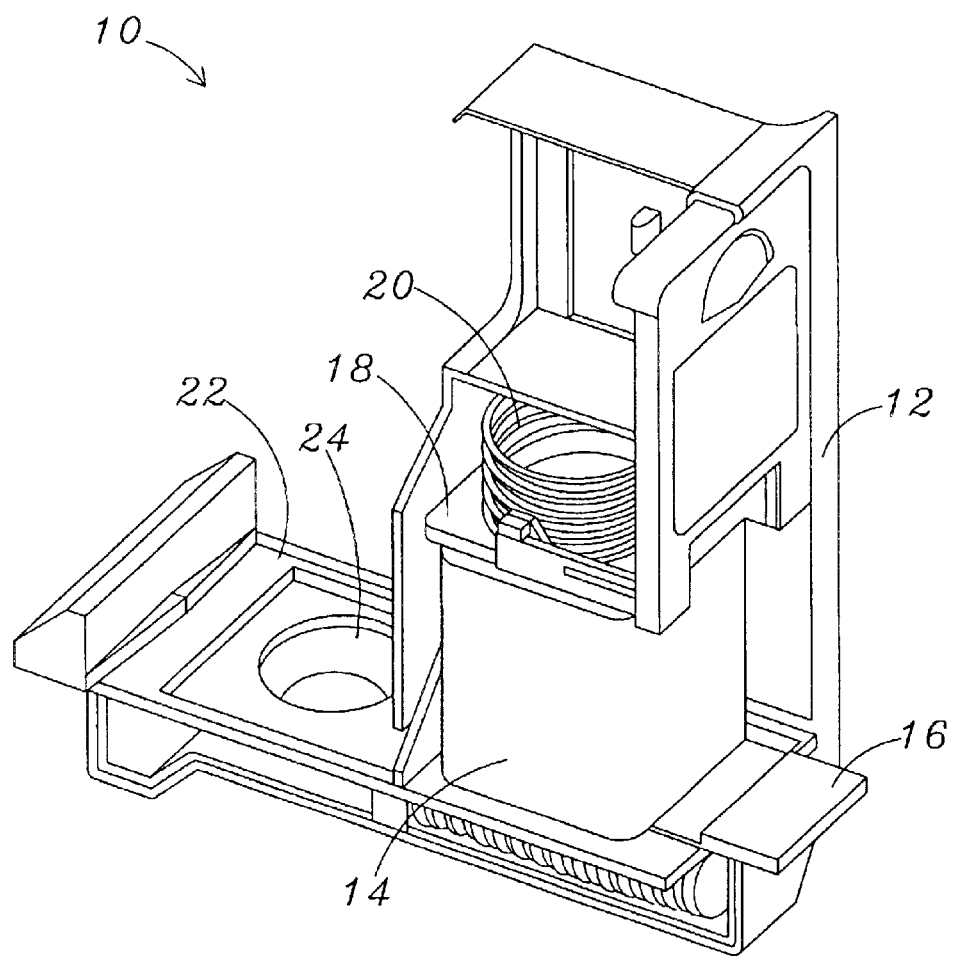
FIG. 1 is a structure diagram of a conventional probe cover dispenser.
Figure 2:
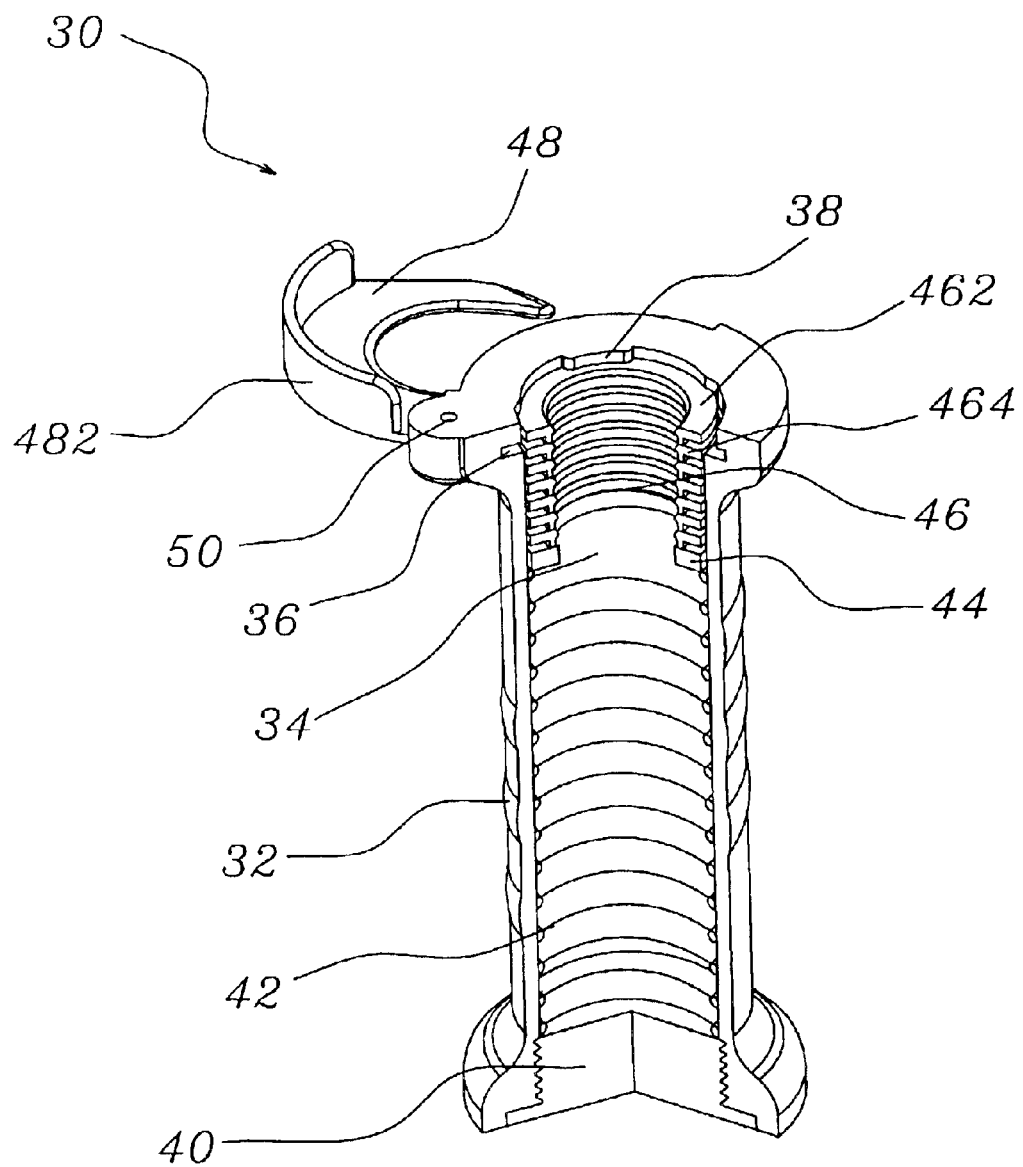
FIG. 2 is a perspective view of a preferred embodiment of the present invention.

As shown in FIG. 2, a probe cover dispenser 30 of the present invention comprises a main body 32, an elastic component 42, and a separation board 48. The material of the main body 32 can be acrylonitric butadine styrene (ABS). The main body 32 has a receiving groove 34 therein. A groove 36 is disposed at the top end of the main body 32. A retaining edge is disposed at the top face of the main body 32 to limit probe covers in the receiving groove 34. A movable bottom cover 40 is disposed at the bottom of the main body 32. The elastic component 42 is usually a spring and is disposed in the receiving groove 34. One end of the elastic component 42 is fixed at the bottom cover 40 of the receiving groove 34, and the other end thereof is connected with an abuts against a separation sheet 44. A plurality of probe covers are stacked in the receiving groove 34 above the separation sheet 44. One end of the separation board 48 is pivotally connected with a flange at the top end of the main body 32 with a pivot 50 so that the separation board 48 can be screwed, or pivotally displaced, into the groove 36 at the top end of the main body 32 to separate a first probe cover 462 and a second probe cover 464. The separation board 48 has also a grip end 482 to be held by a user for conveniently screwing in or out.

Figure 3:
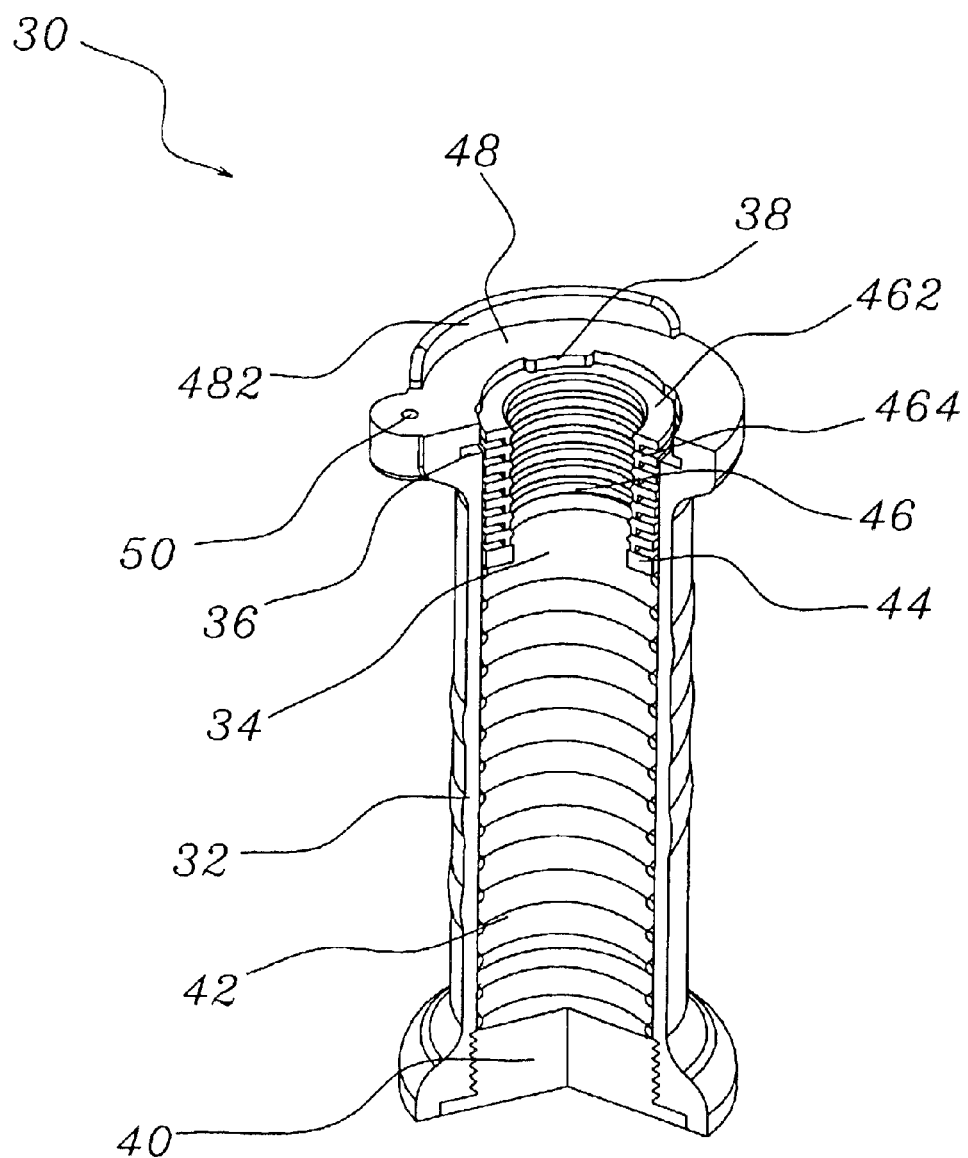
FIG. 3 is another perspective view of the preferred embodiment of the present invention.
Figure 4:
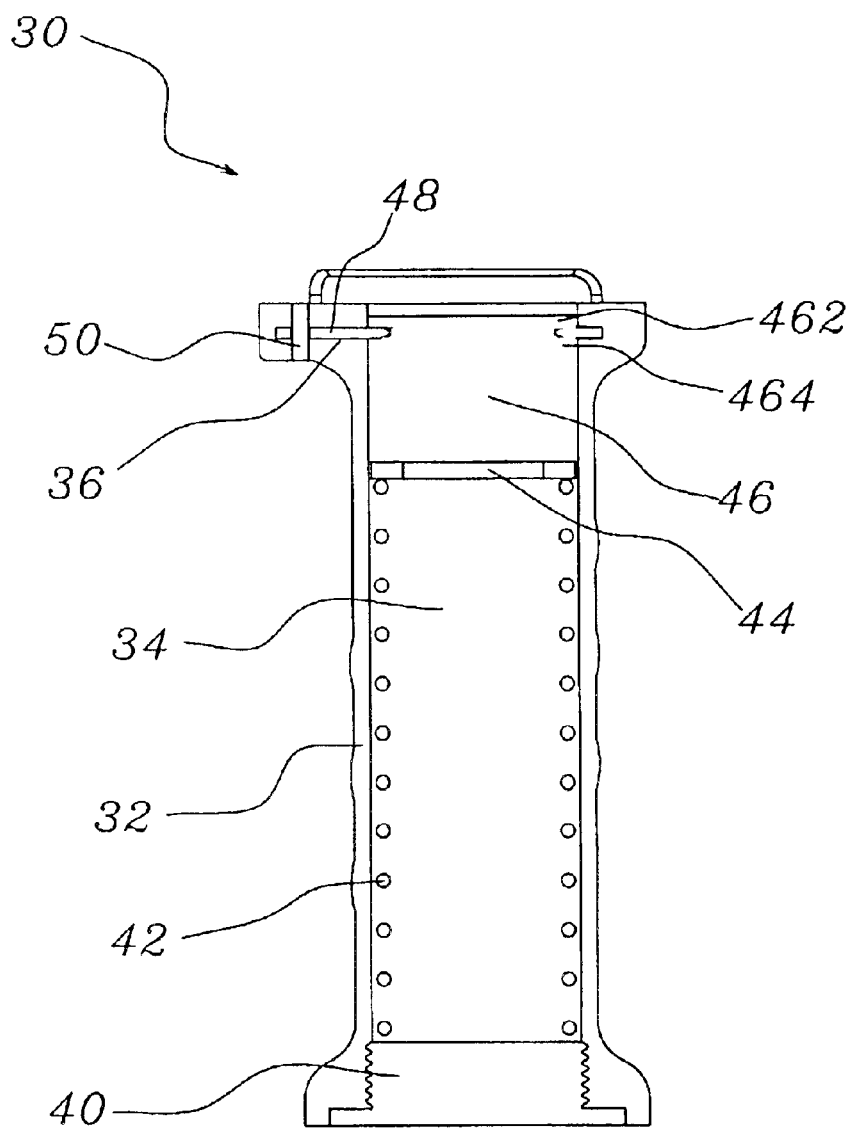
FIG. 4 is a cross-sectional view of the preferred embodiment of the present invention.
Figure 5:
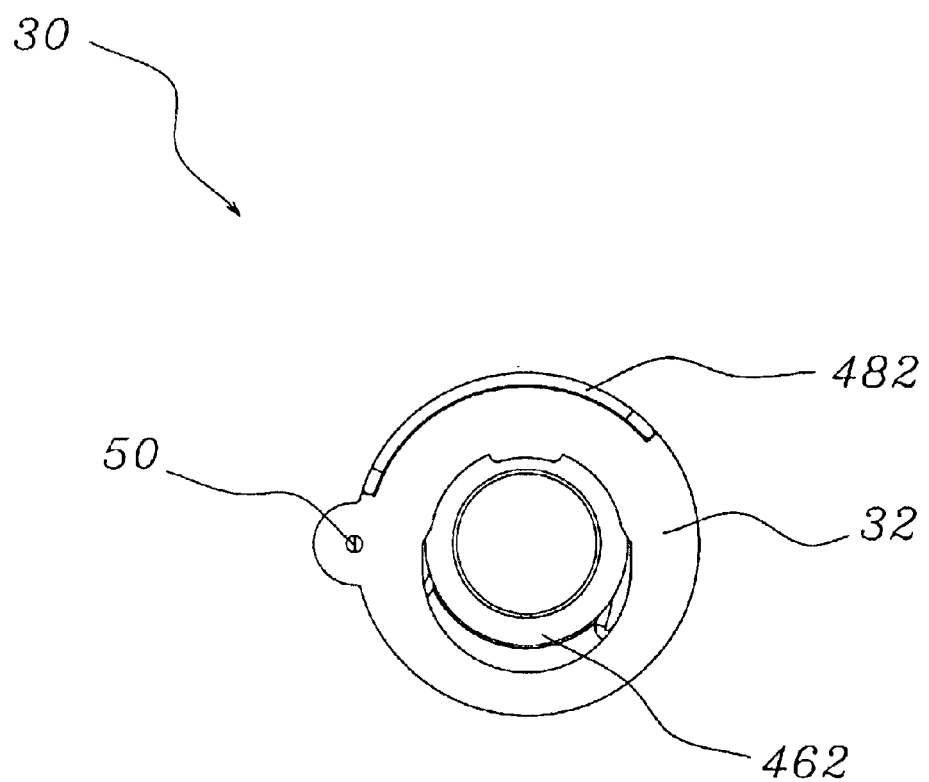
FIG. 5 is a top view of the preferred embodiment of the present invention.

As shown in FIGS. 3, 4, and 5, first, the separation board 48 is screwed into the groove 36 of the main body 32 to separate the first probe cover 462 and the second probe cover 464. Next, a probe of an ear thermometer is inserted into the first probe cover 462. Because the first probe cover 462 is stopped by the separation board 48 and cannot wove downwards, it will be retained within a retaining groove of the probe of the ear thermometer. After the ear thermometer leaves the main body 32, all the probe covers 46 from the second probe cover 464 in the receiving groove 34 of the main body 32 will be stopped by the separation board 48 and cannot move.

When the second probe cover 464 is to be used, it is only necessary to screw the separation board 47 out of the groove 36. All the probe covers 46 from the second probe cover 464 will automatically move upwards due to elasticity of the elastic component 42 so that the second probe cover 464 will shore up against the retaining edge 38 at the top face of the main body 32, as the initial state shown in FIG. 2.

When the probe covers 46 in the probe cover dispenser 30 run out and a user wants to replenish the probe covers 46 himself, under the premise that he wears a sterile glove or fingerstall, the actions are described below. First, after he detaches the bottom cover 40 and takes out the elastic component 42 and the separation sheet 44, the main body is placed upside down, and a stack of probe covers 46 are installed into the receiving groove 34. Next, the separation sheet 44 and the elastic component 42 are placed back into the receiving groove 34 in proper order. Finally, the bottom cover 40 is assembled back to finish the operation. Because the whole structure is simple, tho user can easily detach the structure and conveniently replenish probe covers himself.

To sum up, in the present invention, a receiving groove is disposed in a main body, and an elastic component, a separation sheet, and a plurality of probe covers are disposed in the receiving groove. The present invention makes use of a simple structure provide a probe cover dispenser capable of slipping a probe cover onto a probe of an ear thermometer without touching the probe cover with hands for users. Therefore, the present invention can effectively solve the problems of complex structure and expensive price in the prior art, and can provide a probe cover dispenser of cheap price, small volume, and easy popularization.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A probe cover dispenser comprising:
   a main body having a receiving groove therein, a groove being disposed at a top end of said main body;
   an elastic component disposed in said receiving groove, one end of said elastic component being fixed at a bottom of said receiving groove, a plurality of probe covers being stacked in said receiving groove above the other end of said elastic component, a first and a second of the probe covers being disposed respectively above and below said groove of the top end of said main body; and
   a separation board having one end pivotally connected with the top end of said main body, said separation board being pivotally displaceable into said groove at the top end of said main body for separating the first probe covers from the second probe covers.

2. The probe cover dispenser as claimed in claim 1, wherein a movable bottom cover is disposed at a bottom of said main body so that probe covers can be placed from the bottom of said main body.

3. The probe cover dispenser as claimed in claim 1, wherein a retaining edge is disposed at a top face of said main body to limit said plurality of probe covers in said receiving groove.

4. The probe cover dispenser as claimed in claim 1, wherein a separation sheet is further disposed between said elastic component and said plurality of probe covers.

5. The probe cover dispenser as claimed in claim 1, wherein said separation board further has a grip end to be held by a user for the displacement thereof.

6. The probe cover dispenser as claimed in claim 1, wherein said elastic component is a spring.

7. The probe cover dispenser as claimed in claim 1, wherein said main body is made of plastic material.

8. The probe cover dispenser as claimed in claim 1, wherein the material of said main body is acrylonitric butadine styrene (ABS).

* * * * *